United States Patent
Chang et al.

(12) 
(10) Patent No.: US 6,219,700 B1
(45) Date of Patent: Apr. 17, 2001

(54) METHOD AND APPARATUS FOR MANAGING SERVICES IN A COMPUTER NETWORK FROM A CENTRAL CONSOLE

(75) Inventors: April S. Chang, Los Altos; Andrew R. Large, La Selva Beach; Alan Snyder, Palo Alto, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/124,349

(22) Filed: Jul. 28, 1998

(51) Int. Cl.[7] .................................................... G06F 13/00
(52) U.S. Cl. ............................................................. 709/222
(58) Field of Search ........................ 364/DIG. 1, DIG. 2; 709/200, 203, 208, 209, 213, 214, 215, 217, 219, 220, 221, 222–223, 224

(56) References Cited

U.S. PATENT DOCUMENTS 5,666,501 * 9/1997 Jones et al. ............................ 709/222
5,680,547 * 10/1997 Chang .................................... 709/222
5,980,078 * 11/1999 Krivoshein et al. .................. 709/222

* cited by examiner

*Primary Examiner*—Robert B. Harrell
(74) *Attorney, Agent, or Firm*—Beyer Weaver & Thomas, LLP

(57) ABSTRACT

A method and apparatus for managing computer network services from a central management console program residing on an administration server is disclosed. A service, such as an e-mail program, is installed, typically by a system administrator, on a host server computer. During installation, data relating to the service's management module is stored in a well-known location on the host server computer. A central management console program residing on an administration server causes the retrieval of the data relating to the management module from the well-known location. The central management console program stores the data relating to the management module in a storage area accessible by the console program and the host server computer and thereby facilitates the management and modification of the service from the central management console program. The central management console program can be accessed using a single uniform locator, such as a URL, instead of having to access each individual host service computer to manage services on a computer network.

35 Claims, 12 Drawing Sheets

Sun Internet Administrator

702

Manage Administrators

Add Administrator:

Name      [test] ~704

Password      [****] ~706

Retype Password      [****] ~708

Select services administrator 'test'shall be allowed to make

```
Sun(TM) Internet Administrator
Sample CLI YesYes
Sample CLI YesNo
Sun News(TM)
SunDS
Sun Internet Services Monitor
Sun WebServer
Sun(TM) FTP
sample X
Sun Web Site
```
~710

[Add] ~712

METHOD AND APPARATUS FOR MANAGING SERVICES IN A COMPUTER NETWORK FROM A CENTRAL CONSOLE

BACKGROUND OF THE INVENTION

1. Field of the Invention

The present invention relates generally to computer software and computer network management. More specifically, the present invention relates to server-based management software and software registration in a computer network.

2. Discussion of Related Art

In recent years, computer networks have grown not only in size, such as number of users or geographical coverage, but also in terms of the types of services and protocols a single network can provide and support. Many computer networks allow end-users access to all types of services, such as perusing news services or accessing the Internet, and do not restrict users to one mandatory or required network communication protocol. With the proliferation of services available on some computer networks is the increasing burden on system or network administrators of managing those services. A system administrator now typically has to install and manage software on several servers where each server typically hosts or provides one or more services to network users. Depending on the size of the network and the number of services, the day-to-day management, for example, installing, upgrading, and trouble-shooting, the software behind these services can become a tedious, error-prone, and time-consuming task for a system administrator. This is particularly true with regard to system administrators who are not familiar with the network, the servers, or the configuration of those servers.

In a large-scale computer network that provides many types of services and applications as described above, there are typically several or many server machines accessible by end-users or clients. The fact that there are multiple servers on the network is usually transparent to a typical end-user who is not normally concerned with the physical configuration of the network. A system administrator responsible for managing a computer network normally does so from a server and console, generically described as an administration server, such as a Web server. FIG. 1 is a block diagram of a computer network having multiple servers accessible by end-users and connected to an administration server not configured with the automated management capabilities of the present invention. A computer network 102 has an administrator console shown as client 104 connected to a Web or administrator server 106. Connected to Web server 106 are multiple "service" servers 108. From the perspective of administration server 106, servers 108 are referred to as management clients. Although from an end-user's perspective, they are simply servers, where each server may have a particular function or provide a particular service.

When an update, installation, or any type of maintenance is done on application software residing on one of the servers 108 or a new server is added to network 102, the system administrator must modify software on administration server 106 accordingly. For example, if a new feature is installed on an existing mail server or a new mail server is being added, the administrator must note or remember the location and other information of the new feature or server at the time of the update. The administrator installs a new application on a server 110. This information, including the location of any management modules of the new application, which can be in the form of a Uniform Resource Locator, must then be entered at console 104. Once manually entered at administrator console 104, the information needed to manage the new software or server is reflected on administrator server 106. At this stage the location of any management modules on server 110 are available to the system administrator from administrator console 104. The new mail feature from the example cannot be managed or properly configured by end users until it is "registered" with the administrator server 106. Administration server 106 must know where to find the management modules associated with the new mail feature on management clients 108 before end-users can begin using the software.

This is an inefficient process for the administrator and inconvenient for end-users who have come to expect new applications on their networks to be available for use as soon as possible. This process is also error-prone since the administrator has to perform manual or non-automated tasks such as writing down information on the new feature or server during installation, which must later be entered at a administrator console. This problem is exacerbated if there are dozens of servers, each with many applications (e.g. 30 is not unusual), that have frequent updates, corrections, or new versions that need to be installed in a timely and accurate manner. In this type of setting, managing network services can not only be inefficient, time-consuming, and error-prone, but impractical.

One problem with present Web server based networks typically having multiple service hosts is designing and implementing a user authentication mechanism. A Web server based computer network, or any type of computer network, must have an authentication protocol or mechanism to ensure that a user can perform only those operations or access those files the user is authorized to perform or access. In the case of managing services on the multiple service hosts, there can be more than one system administrator responsible for maintaining the services on those hosts. It is possible that certain administrators are not given complete authorization to perform all possible operations on the Web server and the service hosts, which may only be given to, for example, a senior or "super" system administrator. Thus, since managing services on the hosts is an administration task done through an administration interface, some type of user authentication is necessary.

Although authentication does exist for Web-based networks, present implementations and designs for user authorization are inefficient and repetitive. The authentication referred to here is the verification and authorization of system or network administrators for managing services on service hosts in a network from a browser on an administration console. Typically each service on a service host and its one or more management modules have different authentication mechanisms or standards. There is no clear standard on a protocol or process for implementing authentication and access control in a distributed manner on a Web server based system. A system administrator must re-authenticate every time the administrator signs on to a service host since the service hosts are not in communication with each other. A browser program can be run on a client running any type of operating system, thus, the browser being used by the administrator may not be on a UNIX-based client and may not have a known UNIX identity. Since the browser does not have a known UNIX identity, an identity cannot be communicated from one service host to other service hosts. Thus, a system administrator must go through an authentication process for each service host since the administrator does not have a single or globally recognized identity.

Therefore, it would be desirable to manage end-user application software and services available on a computer network from a central location by having any necessary software for managing those applications and services automatically registered at the central location during installation and accessible from a well-known location. It would also be desirable to have an authentication mechanism that provides for single sign on that functions within the environment of a Web server and that server's existing system of user identity and access control. Further, it would be desirable to achieve this from a central location and by assigning a universal identity to a user managing services from a browser in a Web-server based network.

SUMMARY OF THE INVENTION

To achieve the foregoing, and in accordance with the purpose of the present invention, a method of managing computer network services in a network from a central management console is described. In one aspect of the invention, a service is installed on a service host computer, of which there may be several in the network. Data relating to the management module is stored in a predetermined location, such as a well-known directory, associated with the service host computer. The data relating to the management module is retrieved from the predetermined location on the service host computer using a management console program residing on an administration server computer. The data relating to the management module is stored in a storage area accessible by the management console program residing on the administration server computer thereby facilitating modification of the service installed on the service host computer from the administration server computer.

In a preferred embodiment, the service installed on the host server computer has a service segment and a management module, where the management module stores management data relating to the service and is stored in the predetermined or well-known directory on the service host computer. In another preferred embodiment, the management console program is accessed on the administration server through an administration console having a display monitor that contains a Web browser and a user interface.

In yet another preferred embodiment, the management data relating to a service is registered by being placed in a configuration file and storing the configuration file in the predetermined location. In yet another preferred embodiment, service code associated with the service is installed in a service portion on the host service computer and the management module is stored in a management portion of the host service computer. In yet another preferred embodiment, storing data relating to the management module in a predetermined location involves assigning an identifier to the management module, determining a type associated with the module, assigning a descriptive name for the service, determining a specific location of the module, and saving this data in a component configuration file in the predetermined location.

In yet another embodiment of the present invention, the predetermined location is searched for one or more configuration files associated with one or more services desired to be registered. In yet another embodiment of the present invention, a program executer connected to the administration server computer is initiated for executing commands and transferring service-related data between the administration server computer and the service host computer.

In another aspect of the present invention, a system for managing services in a computer network from a central console on an administration server having an administration console is described. In a preferred embodiment, the system includes a host server computer installed with a computer service that has a management module. A management data storage mechanism stores management data relating to the service in a predetermined location associated with the host server computer. A data retriever obtains the management data relating to the service from the predetermined location associated with the host server computer using a central service manager program residing on the administration server computer. Another management data storage mechanism stores the management data relating to the service in a data repository, such as a database, accessible by the central service manager program residing on the administration server computer thereby facilitating management of the service installed on the host server computer from the administration server computer.

In another aspect of the present invention a system for managing services in a computer network from a management console program is described. The system includes an administration server under the control of an administration server program having a management console program and an interface mechanism for communicating data and executing commands remotely. Multiple host servers under the control of a host server program contain a management module segment and a specified directory for holding configuration files relating to the management module. A client computer is connected to the administration server and is able to communicate data with the management console program on the administration server. A memory component stores data associated with the services and accessible by the administration server and each of the multiple host servers.

In another aspect of the present invention a method of managing the registration of services in a computer network that has an administration server and at least one service host computer that is separate from the administration server is described. The administration server receives a service identifier corresponding to a service desired to be registered and residing on the service host computer. The service host computer is interrogated to determine whether the service has been registered. Service management files related to the service are copied to the administration server when it is determined that the service has not been registered. The service management files related to the service is stored in a persistent global database accessible by the administration server and the service host computer. This allows management of the service by accessing and modifying management data in the service management files through the administration server.

BRIEF DESCRIPTION OF THE DRAWINGS

The invention, together with further advantages thereof, may best be understood by reference to the following description taken in conjunction with the accompanying drawings in which:

FIG. 9 is a flowchart showing in greater detail step 806 of FIG. 8a.

DETAILED DESCRIPTION OF THE PREFERRED EMBODIMENTS

Figure 1:
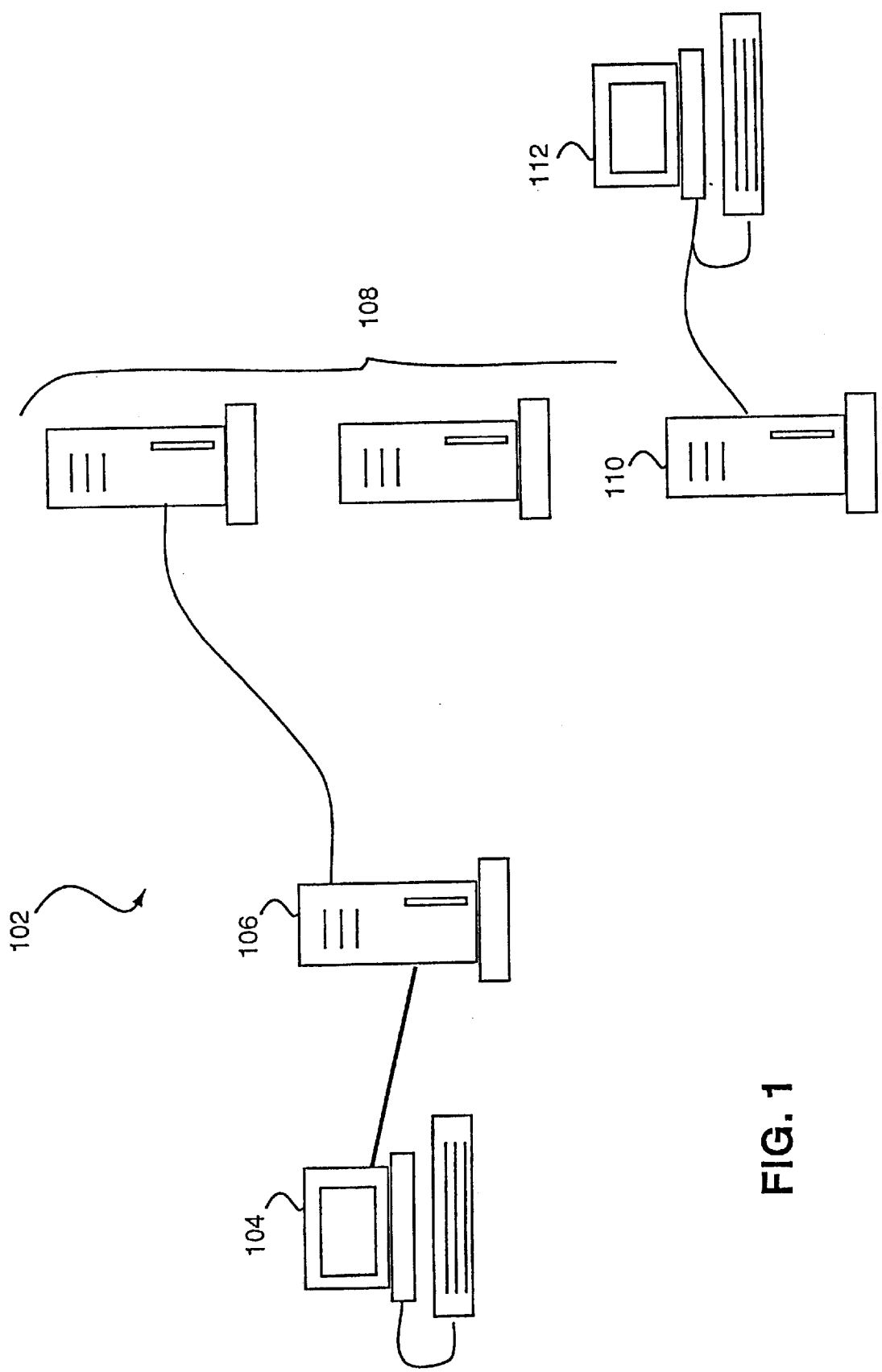
FIG. 1 is a block diagram of a computer network having multiple servers accessible by end-users and connected to an administration server not configured with the automated management capabilities of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for managing software applications and services from a central location in a computer network is described in the various drawings. In a large-scale computer network having multiple servers and a large end-user base, managing applications and software on the network is a time-consuming and error-prone task. Typically, a system administrator installs a new application or service on a service host, i.e., one of the network servers which is normally done at the server. Information relating to management of the application, in particular the location and names of files of management modules, are manually noted by the system administrator. This information is then entered on an administrator server through an administrator console. Once the location of the new application management module is known to the administrator sever, for example a Web server, end-users can access the new application. This process becomes cumbersome and inefficient when there are many servers on the network, each having many applications that require frequent updating, modifying or replacing. This problem is particularly acute from the end-user's perspective in that the expectation that an application be available for use soon after it is received is high. The non-automated two-step process described increases the time before an application can be available to users on the network.

The present invention is a method of automating the process of registering new applications and services at a central management location, such as a Web server, thereby reducing the amount of information the system administrator must remember and making a service available to end-users sooner. In the described embodiment, the present invention involves having a management console program residing on an administration server that manages other servers or service hosts on the network, also referred to as management clients in the sense that these servers are "clients" of the administration server. The described embodiment also includes a persistent storage area containing a database for storing management information and uses (e.g. system or network administrators) authentication information relating to the services on the service hosts and a "well-known" directory associated with each management client. In other preferred embodiments, described in more detail below, the storage areas, for example, can be distributed over the network, instead of being associated with only one server. In another preferred embodiment, the management console program does not reside entirely on the administration server, but can also be distributed between the server and an administrator client machine. These components are shown in FIG. 2.

Figure 2:
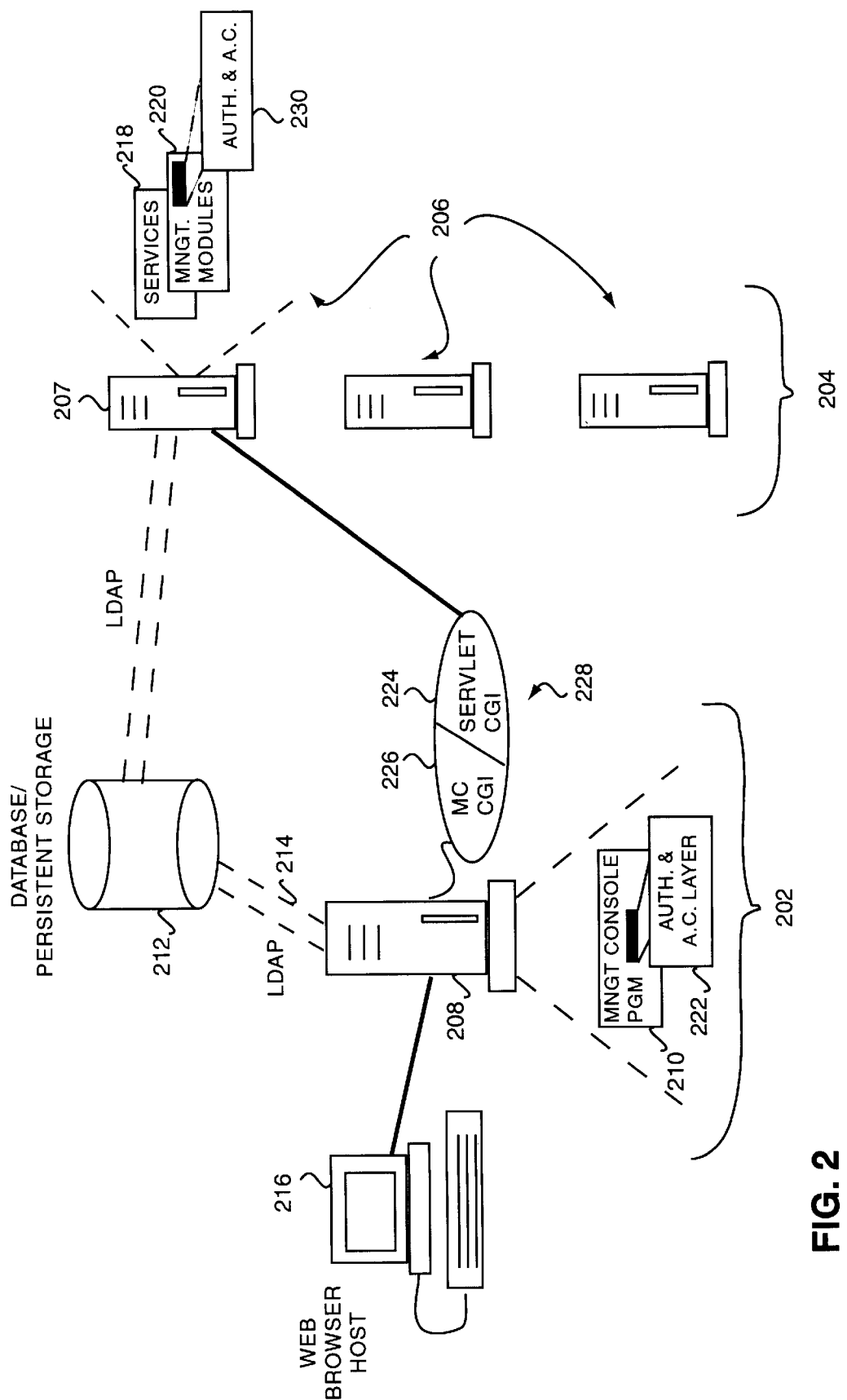
FIG. 2 is a block diagram of server side components of a computer network in accordance with one embodiment of the present invention.

FIG. 2 is a block diagram of server side components of a computer network in accordance with one embodiment of the present invention. A server-side configuration 200 of a complete network (not shown) can be viewed as having two sections, a section 202 representing an administration side and a section 204 representing network servers, or service hosts. Not shown in FIG. 2 are the network end-users on client machines which can typically access network servers 206 to provide services or for running applications, or performing other network operations. Although the end-users of a computer network are one of the beneficiaries of the present invention in that services and applications on the network are available to them sooner and do not go down as often, in the described embodiment the invention is used by a system administrator or network manager (i.e., the user).

In the described embodiment, management clients 206 are managed through a Web server 208. In other preferred embodiments, server 208 can be another type of server, such as a more generic administration server, or be a server that has other functions depending on the size of the network and the capacity of the server. In any case, server 208 in the network has the role of managing management clients 206. One feature of server 208 is that it contains a management console program 210, described in greater detail below. Another feature of Web server 208 is that it has access to a persistent storage area database 212 that stores service management module information. Web server 208 communicates with storage 212 through the light-weight directory access protocol (LDAP) 214. In other preferred embodiments, other data access protocols can be used between server 208 and storage area 212. Storage area 212 is also accessible by management clients 206. Persistent storage 212 is a reliable database that stores data, in the described embodiment, in a hierarchical format. In other preferred embodiments, the database can be in relational database format or store data in an object-oriented type data repository. In addition, in other preferred embodiments, storage 212 can be distributed across persistent storage areas part of management clients 206, Web server 208, and other persistent storage mediums available to the network and accessible by the servers.

As mentioned, the present invention is used primarily by a system administrator. The administrator accesses server 208 through a special client administrator console 216. In the described embodiment, console 216 is equipped with a Web-based browser program that allows the administrator to access server 208 and, more specifically, use management console program 210 and storage area 212. Server 208 can also be referred to as a management console host from the perspective of browser host 216. As will be described in greater detail below, a system administrator can use browser host 216 to manage software applications and services on management clients 206.

Management clients 206 can include all or some of the servers on the network. Those that are managed by a system administrator through Web server 208 communicate with storage 212 via LDAP. Each management client has one or more services shown at 218 and one or more corresponding management modules shown at 220 on service host 207. When a new service is installed or an existing service is upgraded, an entry in management module area 220 is altered. As described in greater detail below, this alteration is reflected in corresponding entries in persistent storage 212. Although services 218 are shown separately from management modules 220 in FIG. 2, the two components are integral to each other. In other words, a service's management module is integrally bound with the main body or functional modules of the service. However, the two components still have separate roles. Management modules 220 are stored in configuration files, a configuration component directory is described in greater detail below. In other preferred embodiments the information in management modules 220 can be stored in other formats such as a database or a standard directory that also contains other non-management files.

The remaining components in FIG. 2 relating to the management console program address authentication and access control features. Management console program 210 has an authentication layer 222 that performs user verification and authorization functions described in greater detail with regard to FIGS. 7 to 9 below. Associated with console host 208 is a Common Gateway Interface, or CGI program, used by a Web server to execute programs. In the described embodiment, a CGI program 224 is used to execute programs from console host 208 and is logically divided in to two parts: a management console CGI 226 and a servlet CGI 228. Management console CGI 226 communicates with management console program 208 and is discussed in greater detail with respect to FIGS. 8a and 8b. Servlet CGI 228 communicates authentication data from console host 208 to the service hosts 206, and is a component well known in the art.

On service hosts 206 is a corresponding authentication and access control layer 230 that is part of management module component 220. Authentication layer 230 receives data from console host 208 through servlet CGI 228. These components are used to ensure that a system administrator logging on to use the management console program to manage particular services is authorized to manage those services and also allows a "super" system administrator to add and delete administrators and particular privileges in the management console framework. In the described embodiment, this functionality is illustrated through a graphical user interface shown in FIG. 7. Service hosts 206 re-authenticate a user's access control and authorization with persistent data storage 212.

Figure 3:
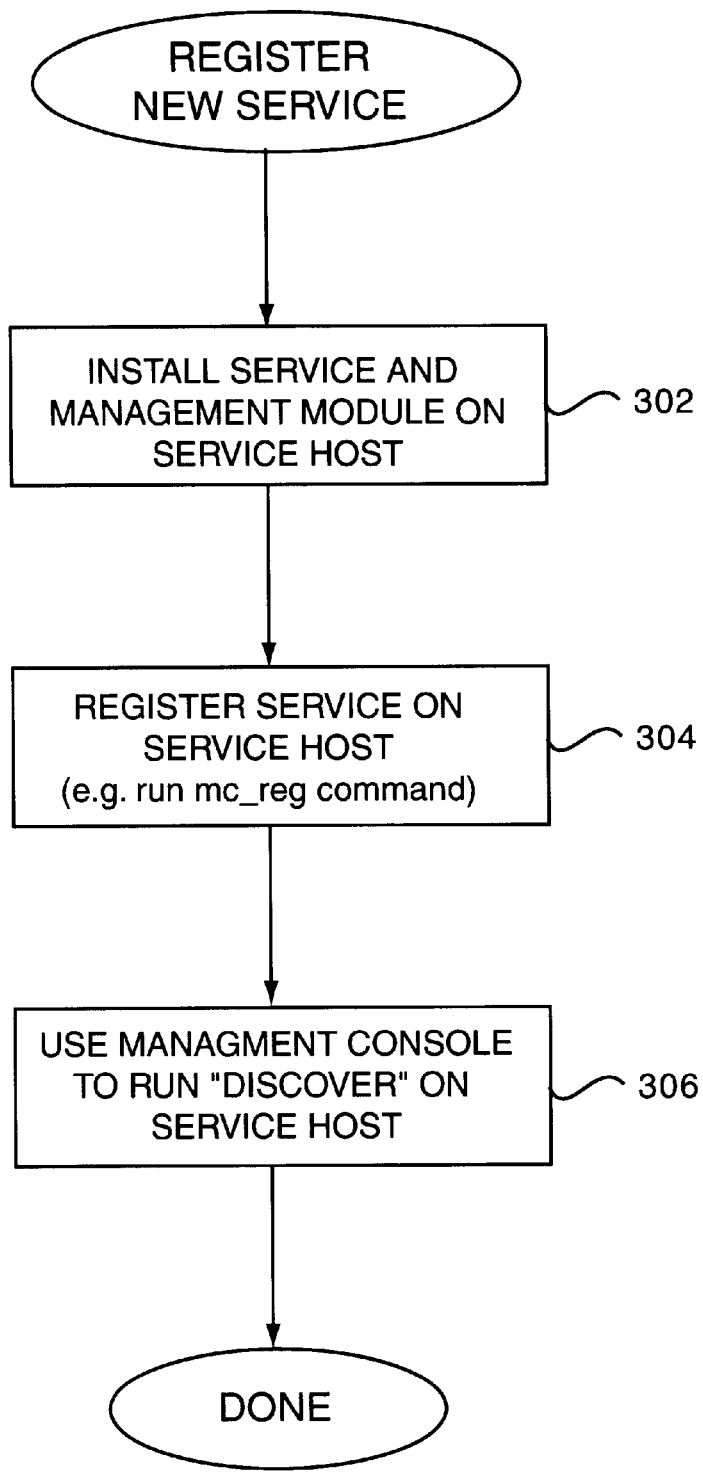
FIG. 3 is a flowchart showing an overview of a process for registering a new service on a network in accordance with one embodiment of the present invention.

FIG. 3 is a flowchart showing an overview of a process for registering a new service on a network in accordance with one embodiment of the present invention. The flowchart shows the steps taken by a system administrator when registering either a new service, upgrading a service, or adding a new management client to the network. At step 302 a service is installed on a particular management client. This is typically done through a client machine functioning as a browser host and is usually performed by a system administrator. A management module, associated with the service, is a segment of executable code that is also installed on the management client. An example of a management module on a mail server is a module indicating a maximum quota per end-user; that is, the maximum amount of memory a user can take up. Another example is a Web server owned by an ISP (Internet service provider) that hosts web sites for its customers. In this context a management module can manage the addition of a new Web site on the Web server.

The management module can be one of several types. In the described embodiment, the types of management modules are browser-based, X-based, and command line. A browser-based management module is associated with an application that is executed in a Web browser. It is anticipated that a large majority of the application types will be applications that run in a Web browser. An X-based management module is typically associated with a stand alone application that is run based on the X-protocol, a component of the UNIX operating system. These applications are generally not run from within a browser but from the operating system shell. It is derived from standard and well-known X-windows, a UNIX-based graphical user interface. A command line management module is associated with an application which is managed using command lines, but can be embedded and executed from a Web browser. A command line may or may not have runtime parameters as is described below. Examples of command line commands are "ls" (obtain a list of files), "whoami" (return information on current user), and "ps" (provide information on performance status) In other preferred embodiments other types of management modules can be installed.

At step 304 the system administrator registers the service and management modules on the management client. In the described embodiment this is done by running a command referred to as mc_reg on the management client. By registering the service and management modules, the administration server (server 208 in FIG. 2) is informed of what type of module is being installed. Typically, a system administrator registers several new services on various management clients. Thus, steps 302 and 304 are repeated for several services on various management clients. Once a service is registered on a service host, certain files referred to as component configuration files storing management data are created and stored in a component configuration directory on the service host. Step 304 is described in greater detail with respect to FIG. 4.

At step 306 a "discover" routine is initiated through a graphical user associated interface associated with management console program 210 and is run on a service host. This routine allows the management console program to register a particular service host. The system administrator, for example through browser host 216, instructs the management console to go to a particular service host or group of service hosts and check to see what has been registered. In the described embodiment this is done by the management console by checking a well-known directory referred to as the component configuration directory on the service hosts indicated by the system administrator. Step 306 is described in greater detail in FIG. 5. In a preferred embodiment the discover routine can be run locally on the service host at the time the service is being installed at step 302. The service host can then broadcast the results of the remote or auto discover to the management console program. In the described embodiment, the system administrator can tell the management console to go register all the service hosts that were recently modified, upgraded, or newly added by the administrator. In the described embodiment, the management console program proceeds to check those service hosts and will register any updates by checking the component configuration directory. Once all the modified service hosts have been registered, end-users can begin using the services or applications and the registration process is complete.

Figure 4:
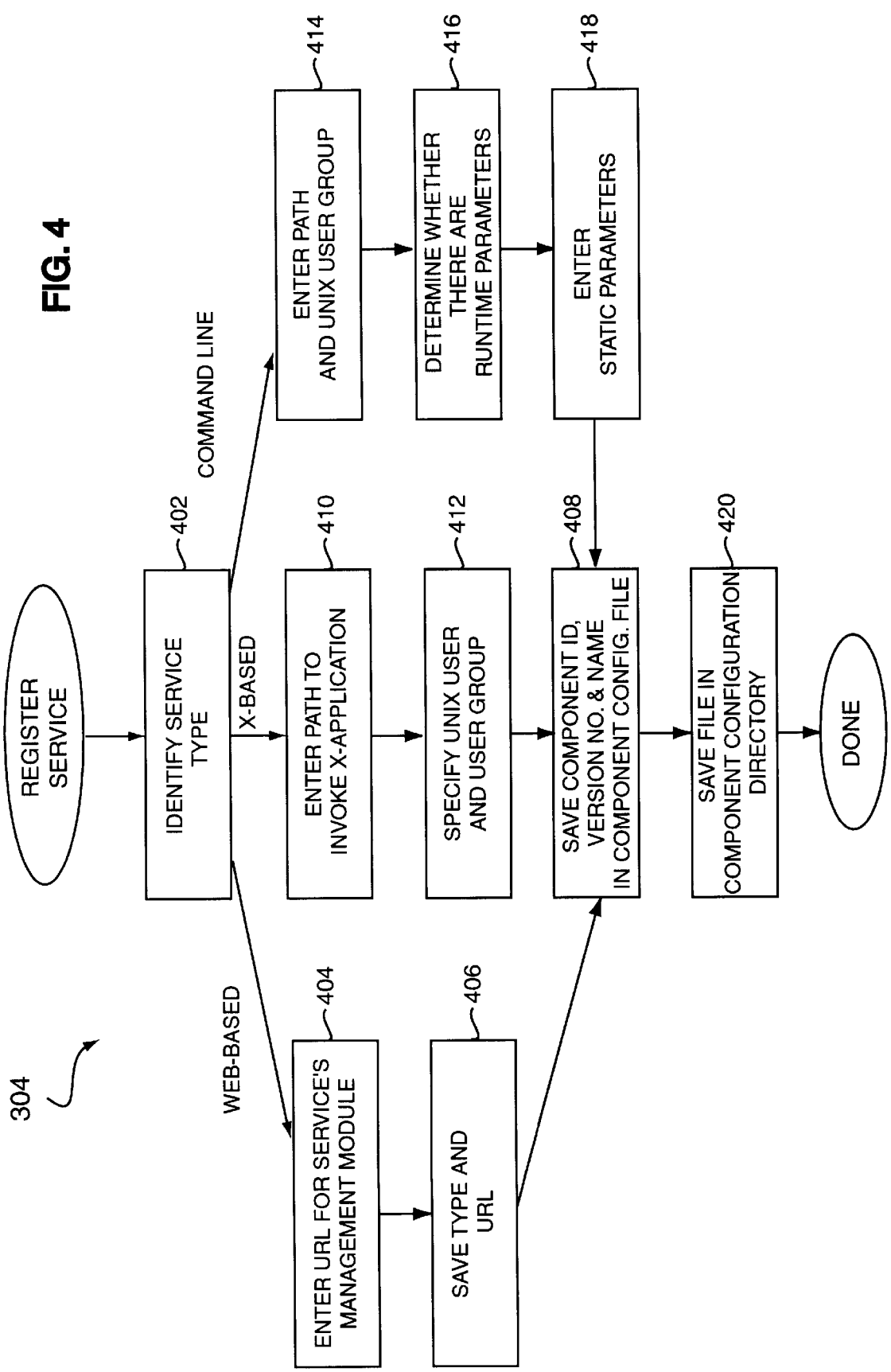
FIG. 4 is a flowchart showing in greater detail step 304 of FIG. 3 of registering a service in accordance with one embodiment of the present invention.

FIG. 4 is a flowchart showing in greater detail step 304 of FIG. 3 of registering a service in accordance with one embodiment of the present invention. Step 304 introduced the process of registering a new service on a service host so that the management console can later discover that the a new service has been registered on that host as instructed by a system administrator. At step 402 the service or application type is identified to the service host. As described above, in the described embodiment, a service can be one of three types: browser-based, X-based, and command line. In other preferred embodiments, additional types can be entered. In the described embodiment, this step is performed on the service host and is one way of informing the management console of the application type. In other preferred embodiments, this information can be entered at the browser host. Information inputted at the service host after step 402 depends on the type of service identified. If the service is Web-based, the flowchart proceeds with step 404. At step 404 the system administrator enters the location of the service's management module on the service host. In the case of Web-based services, the location is typically in the form of a Uniform Resource Locator, or URL. At step 406 the service type and the URL of the management module is saved as parameters in a well-known location on the service host. In the described embodiment, these two items of information, referred to as components, are saved in a UNIX file referred to as a component configuration file in the directory referred to as a component configuration directory. In other preferred embodiments, other directories on the service host can be used to store these components.

At step 408 the two components contained in a service management module are assigned component identifiers. In the described embodiment, this consists of two parts: (1) a unique identifier (such as a Solaris package name, e.g. SUNWFIP), and (2) a version number. Thus, the URL and the service type components are assigned a component identifier and saved in a file in the component configuration directory. In addition a "user friendly" name for the service, which up to this point has been a unique but lengthy and cryptic name, is entered. This user friendly name is the name that will be displayed on the graphical user interface, described in greater detail with respect to FIG. 6 below. At step 420 the data or components described in steps 406 and 408 are stored in an appropriate file in the component configuration directory. Thus, after step 420 all the information needed to perform step 306 of FIG. 3 (the "discovery" process) for a Web-based type service is stored in an appropriate file at a well-known directory and the process is complete.

Returning to step 402, if the service type is X-based, control proceeds with step 410. As described above, an X-based type service is typically associated with a stand alone application that is run based on the X-protocol, a component of the UNIX operating system. At step 410, the system administrator enters the path necessary to invoke the X-based application. At step 412 a UNIX user and user group are entered in order to invoke the X-based application. Control then goes to step 408 where the path, user name, and group are assigned component identifiers. At step 420 the component identifiers are stored in an appropriate file in the component configuration directory.

For command line type management modules, the system administrator enters data similar to the X-based type: a path to invoke the command line, and a UNIX user and group name necessary to invoke the UNIX application, as shown at step 414. At step 416 the system administrator determines whether there are any runtime parameters in the command (reflected in the command line type management module). Those parameters are not entered at the time the service is being registered but at the time the command is executed or run by the end-user. The graphical user interface is modified or customized to reflect whether the end-user can enter runtime parameters (e.g. options the user can select at the time the service is being used). If there are runtime parameters, the system administrator supplies them in response to a prompt from the management console's graphical user interface. At step 418 the system administrator enters static parameters required by the command. A command line type management module will always have static parameters regardless of whether the command has runtime parameters. Control then goes to step 408 where all the data is assigned component identifiers, as was done for X-based and Web-based management modules. The component identifiers are then saved in files stored in the configuration component directory at step 420. In the described embodiment, the file name has the format of "component identifier—version number" which facilitates determining the number of components that are registered in the directory where each component has one file. In other preferred embodiments, the file name can be in another formats where there is one file per command, e.g. component identifier—command #. .

Figure 5:
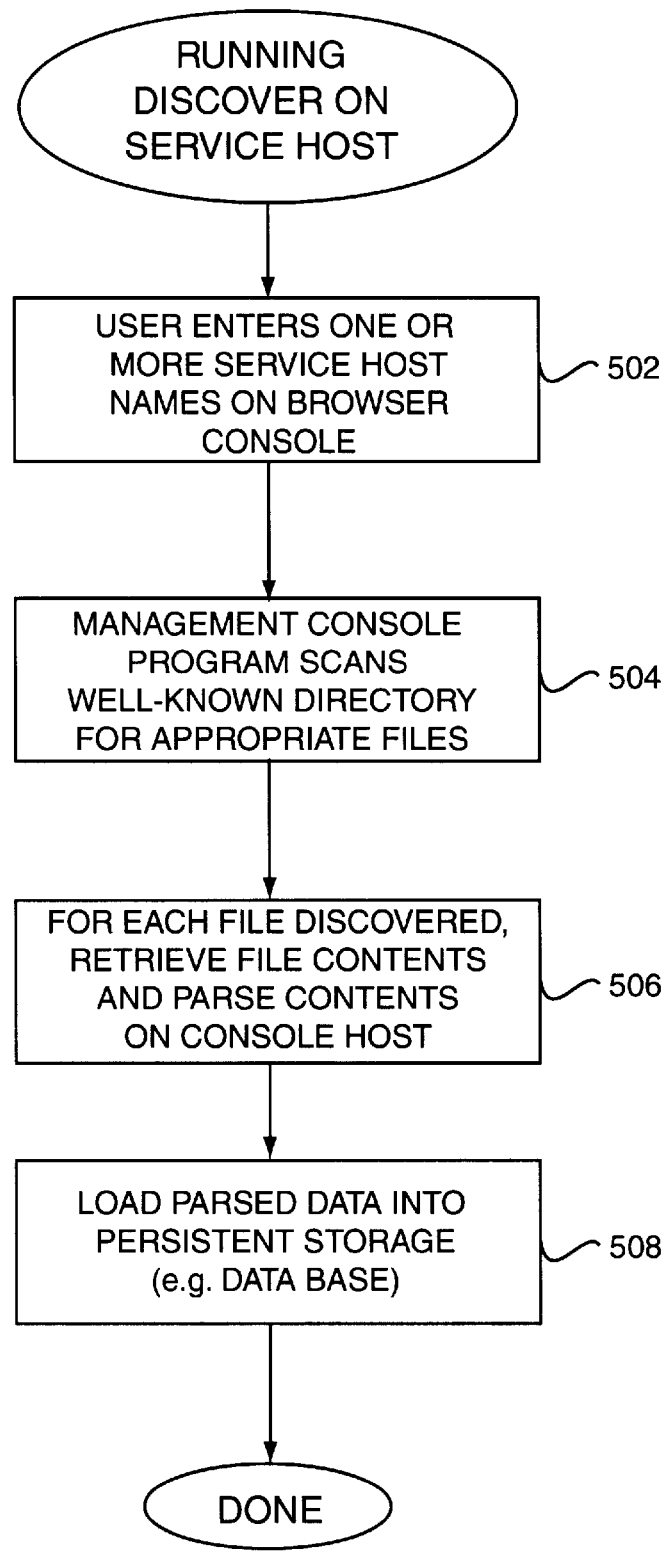
FIG. 5 is a flowchart showing in greater detail step 306 of FIG. 3 in accordance with one embodiment of the present invention.

FIG. 5 is a flowchart showing in greater detail step 306 of FIG. 3 in accordance with one embodiment of the present invention. In the described embodiment, a service host has a component software segment running that contains all the management modules of the services on that service host. The component configuration directory resides in this segment. The service host also has a management console framework segment that contains code also contained in the management console program residing on the administration server. For example, the mc_reg command and ISP remote shell code, a program for remotely executing X-based and command line management programs, reside in both the management console and the service host. FIG. 5 describes a discovery process that searches the component software segment on a service host for management modules that have not yet been registered using software in the management console framework segment.

At step 502 a system administrator specifies a service host name or a service name through a graphical user interface on the browser host. Examples of graphical user interfaces used in the described embodiment are shown in greater detail in FIGS. 6 and 7. As described above, there can be many service hosts, each of which have several services available. These choices are presented to a system administrator through a user interface. Typically an administrator will choose all the service hosts that contain services that were recently modified or added, and will enter all those service hosts at once from the browser host. At step 504 the management console host connects to the one or more service hosts specified at step 502 to scan a well-known directory for component configuration files. In the described embodiment the well-known directory is the component configuration directory. The management console communicates with the service host through a standard CGI (Common Gateway Interface) program, typically used to initiate a Web-based program from a Web server, and is well-known in the art. In other preferred embodiments the CGI program may not be needed if the administration server is not a Web-based server. The scanning is performed using a command line program that sends commands across a network connection and have them executed on the destination server. More specifically, in the described embodiment, the commands are executed by the management console, over the network connection, on the service host. In the described embodiment, this is done using an ISP remote shell protocol. Thus, during the scan the UNIX "list files" command, ls, is executed in the component configuration directory to get a list of the component configuration files. A list of files that need to be registered with the management console is sent to the administration server.

At step 506 the management console examines the list of files "discovered" on all the service hosts that were specified in step 502. The same connection between the management console and the service hosts is then used to retrieve the contents of those files. In the described embodiment, the UNIX "concatenate" command, cat, is used on the service host to retrieve the content of each file. In other preferred embodiments, similar commands for retrieving the content of a file in other operating systems can be used. Once the contents of each file to be registered are retrieved from the service hosts, the content of each individual file is parsed using standard and well-known parsing techniques by the management console on the administration server. In the described embodiment, a component configuration file is flat ASCII file. By parsing the content of a file, the file's user friendly name, component identifiers, and other command execution information are identified for each file. In the described embodiment, this information reflects the information that was saved in the component configuration directory for each of the three management module types as shown in FIG. 4.

At step 508 the data parsed from the component configuration files is stored on a persistent storage area. As described above, a component configuration file contains all the information that is needed to launch a corresponding service. This information is now stored in a database on persistent storage accessible by the management console program and by the service hosts. A system administrator can now manage a service through the management console by modifying the content of that service's management data stored in the persistent and reliable database. In the described embodiment, data on the persistent storage remains when the network is down or when the management console is not active, and is accessible through the lightweight directory access protocol (LDAP). In other preferred embodiments, alternative access protocols can be used depending on the type of storage being used and the network.

Figure 6A:
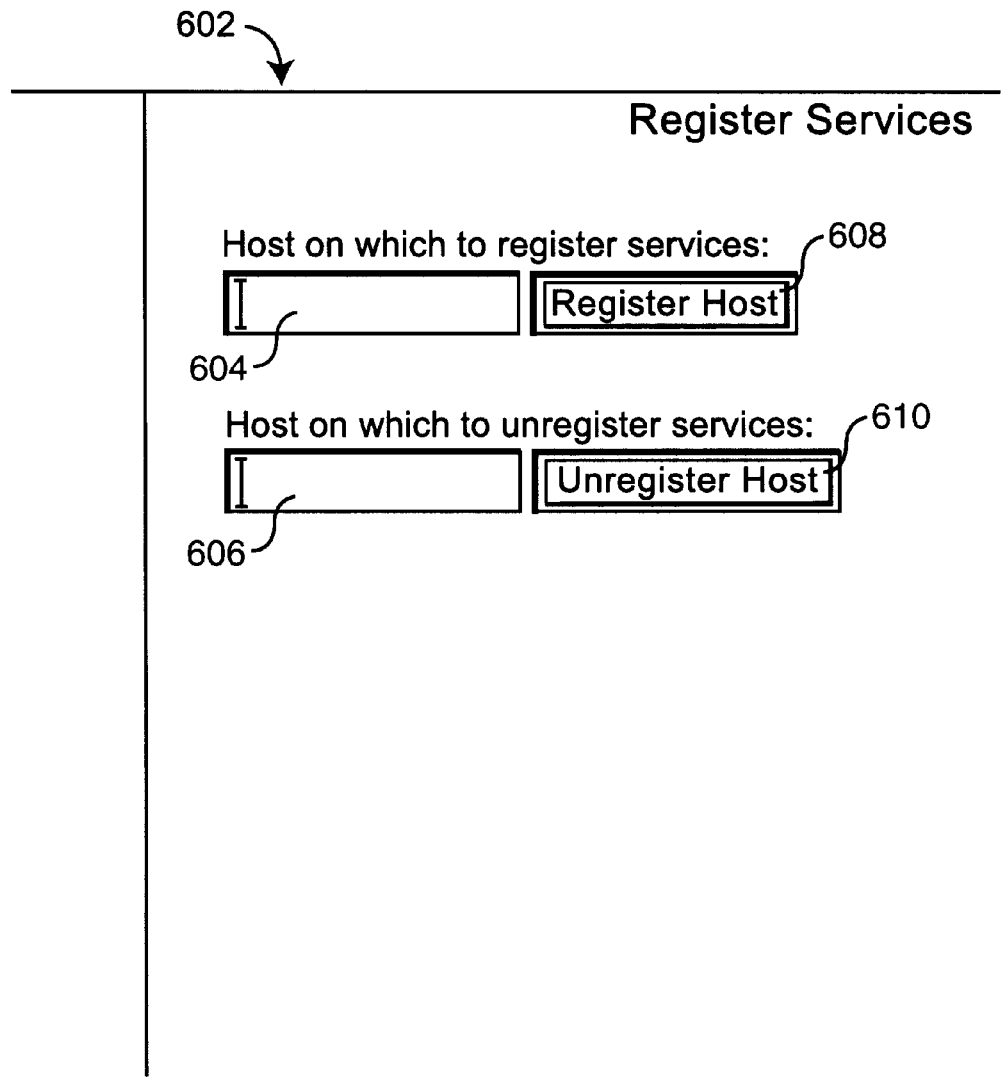
FIGS. 6a and 6b are screen shots of a graphical user interface displayed on the browser host in accordance with one embodiment of the present invention.
Figure 6B:
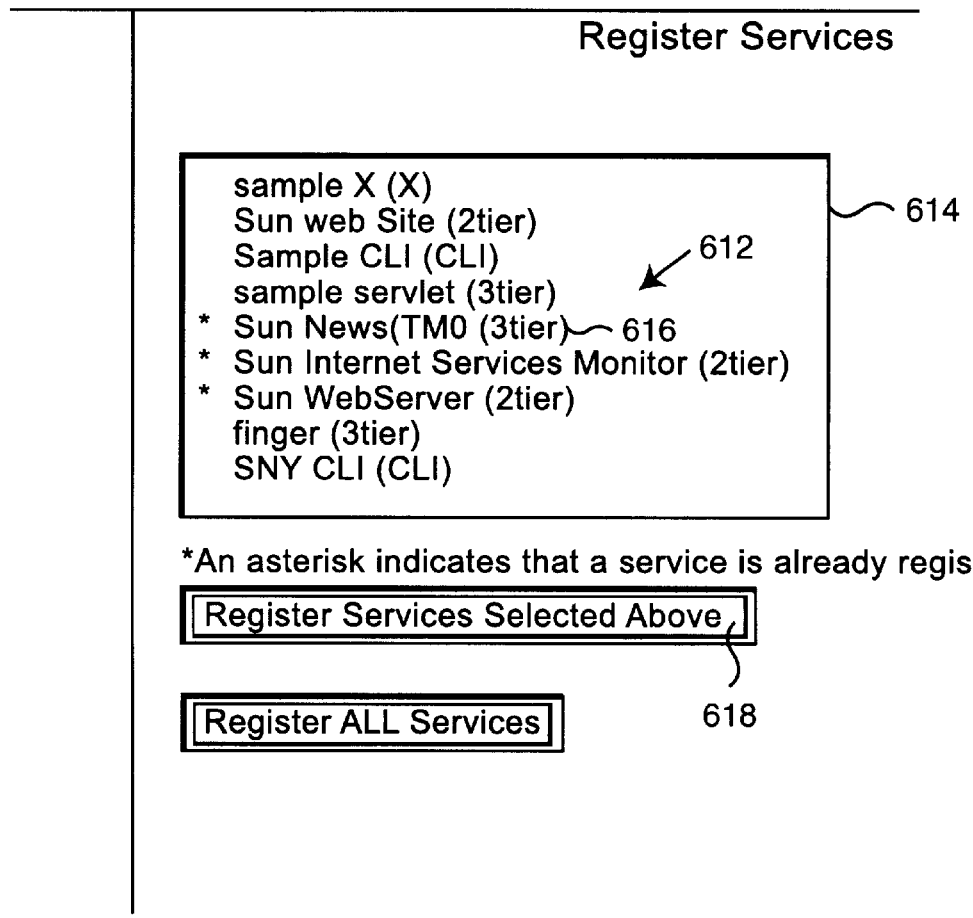

FIGS. 6a through 6c are screen shots of a graphical user interface displayed on the browser host in accordance with one embodiment of the present invention. FIG. 6a is an initial screen shot of the "Register Services" user interface. A window 602 contains a text entry sub-window 604 in which a system administrator enters the name of a service host on which services the administrator wants to manages reside. In the described embodiment there is an area to enter one service host. In other preferred embodiments an administrator can enter more than one service host. Also shown in text entry sub-window 606 in which an administrator can enter a service host name that contains services the administrator wants to unregister. Once the choices have been entered, the user can click on button 608 to retrieve a list of services that the user is authorized to manage on that service host. The administrator can also press button 610 to retrieve a list of services on that service host which can be unregistered.

FIG. 6b is a screen shot showing another segment of the "Register Services" user interface. This graphical user interface allows a system administrator to select services that the administrator is authorized to manage. User authorization and access control is described in greater detail below. A list of services 612 is displayed in a window 614. List 612 is derived from data relating to the user stored in the database and contains those services available on the service host entered in field 604 of FIG. 6a. The system administrator selects those services he wants to manage or access. In the described embodiment this is shown with an asterisk to the left of the service name, such as the Sun News (TM) service 616. Once the service or services have been selected, the user clicks on the "Register Services Selected Above" bar 618. In the described embodiment this is done using a pointing device such as a mouse or track ball and is implemented in a window environment. In other preferred embodiments, a non-graphical user interface, such as a simple text based interface or a more sophisticated voice-recognition based interface can be used to enter this information, as well as the information described below with respect to the other screens.

As described above, a management console program of the present invention includes a "single sign-on" method of user authentication and access control that benefit from having a central management console for managing services on multiple service hosts in a distributed Web-based network. Presently in Web-based networks a system administrator responsible for maintaining services available on multiple service hosts must re-authenticate and pass the administrator's credentials to each service host to which the administrator logs on. This is true since the administrator, operating from a browser, does not have a single, universal identity that can be used for authentication. Here authentication refers to verifying credentials and authorizations of a user before being allowed to manage a particular service host or, more specifically, perform operations for managing services on a particular service host. It is necessary to have a consistent understanding throughout the network of who the user is and what that user is allowed to do on the service hosts.

The present invention allows centralized management and user single sign on for authentication relating to management of services on service hosts from a browser host. The management console program 210 of FIG. 2 contains an authorization and access control component or layer 222. This authorization layer accesses user data from database 212 for verification and communicates this information to corresponding authorization or authentication layers 230 on a service host 206. The information is handled and transmitted to each service host a system administrator wants to manage, without having the administrator re-authenticate on each individual service host.

Information relating to each user is stored in database 212 and information entered by a user is authenticated against this information. The information, or credentials, if verified, is passed through a CGI program to the service hosts indicated by the user. Once received by the service hosts the information is re-authenticated against the user profile in the database on behalf of the system administrator; in other words, this is done "behind the scenes" without intervention or any extra steps from the user. The user only has to log on (i.e. enter certain information such as name and password) to the management console through a browser once and this information is passed on to the service hosts automatically.

Figure 7:
FIG. 7 is a screen shot of a graphical user interface relating to the access control and authentication of a user of the management console program in accordance with one embodiment of the present invention.
Figure 7:

FIG. 7 is a screen shot of a graphical user interface relating to the access control and authentication of a user of the management console program in accordance with one embodiment of the present invention. A window 702 has the heading "Manage Administrators." This window is used to enter new administrators and associated passwords and services the new administrator will be allowed to manage. Within window 702 is a sub-window 704 for entering an administrator name and sub-windows 706 and 708 for entering and reentering a password. In the lower portion of window 702, another sub-window 710 contains a list of services from which the administrator entered in sub-window 704 will be allowed to manage. Once the services are selected by the managing or "super" administrator, the button 712 is pressed.

Figure 8A:
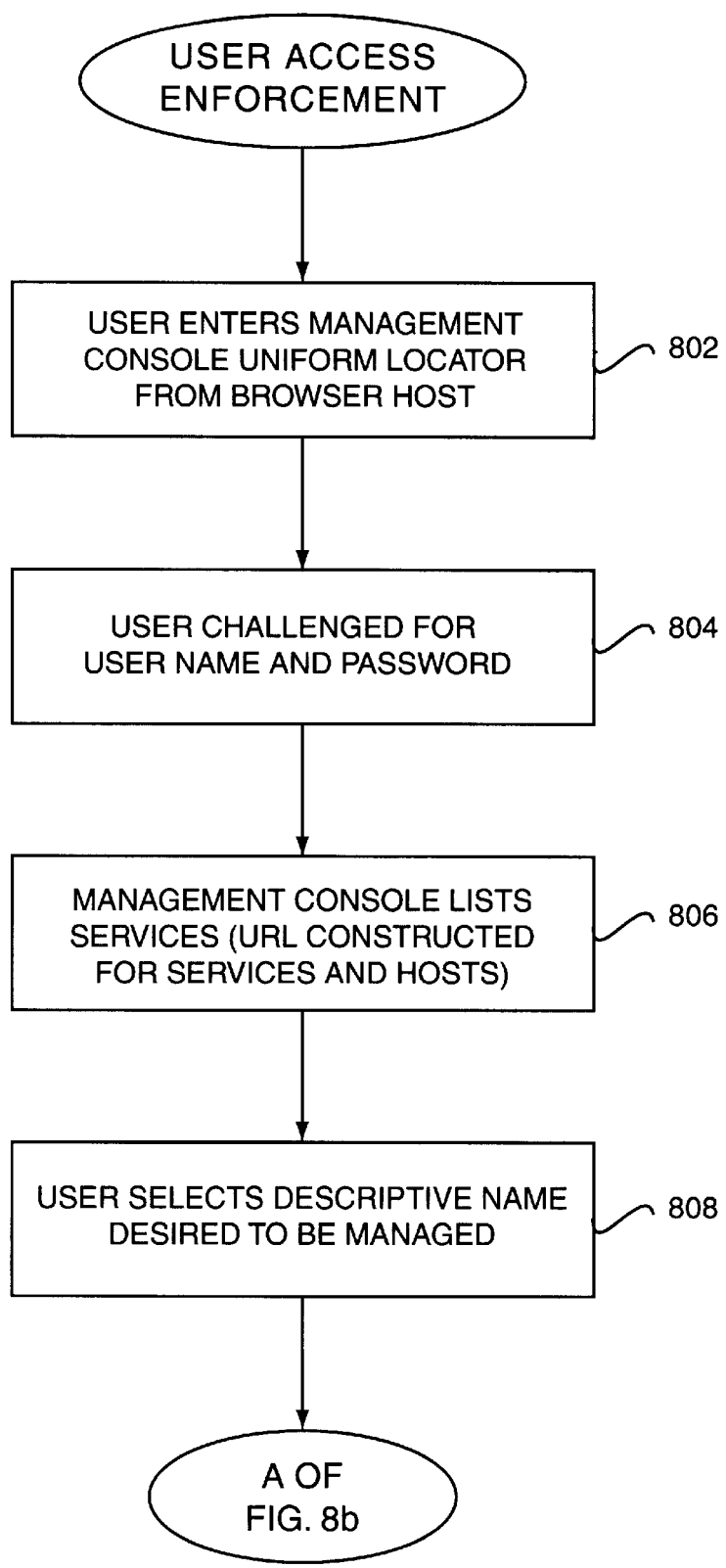
FIGS. 8a and 8b are flowcharts of a process for enforcing access control and authorization in the management control program in accordance with one embodiment of the present invention.
Figure 8B:
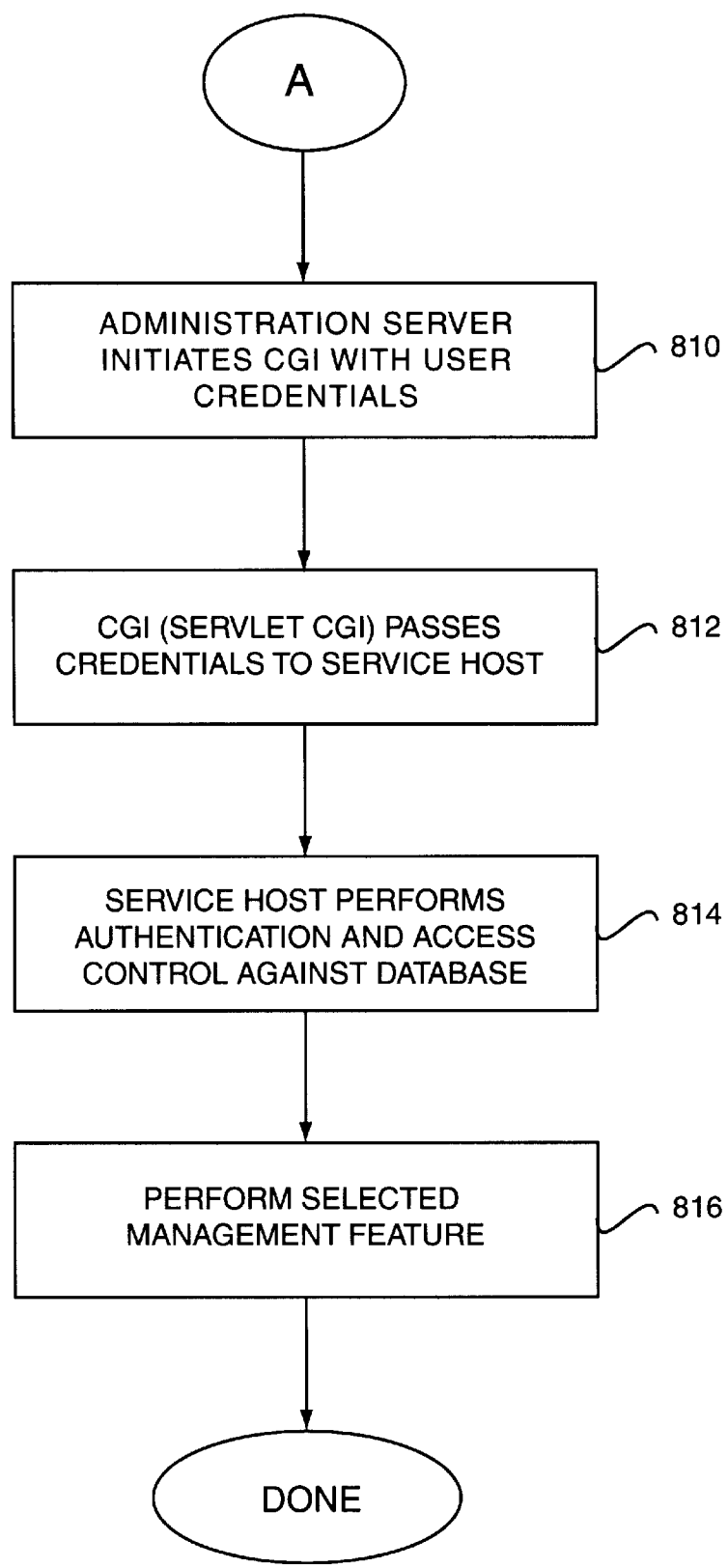

FIGS. 8*a* and 8*b* are flowcharts of a process for enforcing access control and authorization in the management control program in accordance with one embodiment of the present invention. The enforcement process begins with a user pointing the browser host (i.e. administration console 216 of FIG. 2) to a URL of the management console host. Thus, at. step 802 the user enters the URL of the console host from the browser host. The URL for the management console is in the form of a standard URL in a Web-based network. In other preferred embodiments, other types of locators can be used depending on the type of network.

At step 804 the administrator/user is challenged for a user name and password for access to the management console program on the console host. At step 806 the management console accepts the user name and password entered in step 804 and the user is authenticated. This step is described in greater detail in FIG. 9. The management console displays the services on a selected service host as shown in area 612 of FIG. 6 that the user is authorized to manage by examining data in database 212. This is done by using the management console segment of the CGI as shown in FIG. 2. In the described embodiment, an administrator's authorization is defined in terms of services that the administrator is allowed to manage. During this step the management console constructs a URL for each service and host that the administrator is allowed to manage. This process is also described in greater detail with respect to FIG. 9. The URLs allows the console host to locate each service host and service that can be managed by the administrator.

At step 808 the user selects an instance of a service (i.e. a particular service from a service host) that the user wants to manage. A service can reside on several different service hosts so the user must choose an instance of a service from a particular service host.. By selecting the user friendly name the user has selected one of the URLs constructed in step 806. At step 810 the management console host initiates the servlet CGI component of the CGI. In the described embodiment, this is done by comparing the user credentials or profile against the user's authentication and access control data in the database. This verification is performed before a connection is made to the service host by servlet CGI 224 as an extra precaution against users trying to manage services on that service host without going through management console host 208. Since this is a network environment, it is possible for a user to bypass the console host verification steps and attempt to access services on a service host directly from a client machine, instead of from browser host 216 of FIG. 2. Thus, the user credentials are compared against the user data stored in database 212 by the servlet CGI.

At step 812 the servlet CGI uses a standard procedure for passing the user credentials to the service host or hosts indicated by the user. In the described embodiment, once the data is received, the service host performs authentication and access control using the data by comparing it against data in the database. In other preferred embodiments, this step may not be necessary depending on independent security features available on the particular network implementing the management console program. This re-authentication is done without any intervention from the user and is performed to ensure that a user is not attempting to log on directly to the service host thereby circumventing the authentication and access control layer of the management console host. Thus, by performing a second check against the database without requiring the user to perform any extra operations, the management console can ensure secure management of services in the network. If the re-authentication is successful at step 814, management console program on the console host allows the user to perform management operations on the selected service or services from the browser as shown at step 816 at which point the enforcement process is complete. If the re-authentication is not successful, the user is denied authority to manage the selected service and is shown the login screen again.

Figure 9:
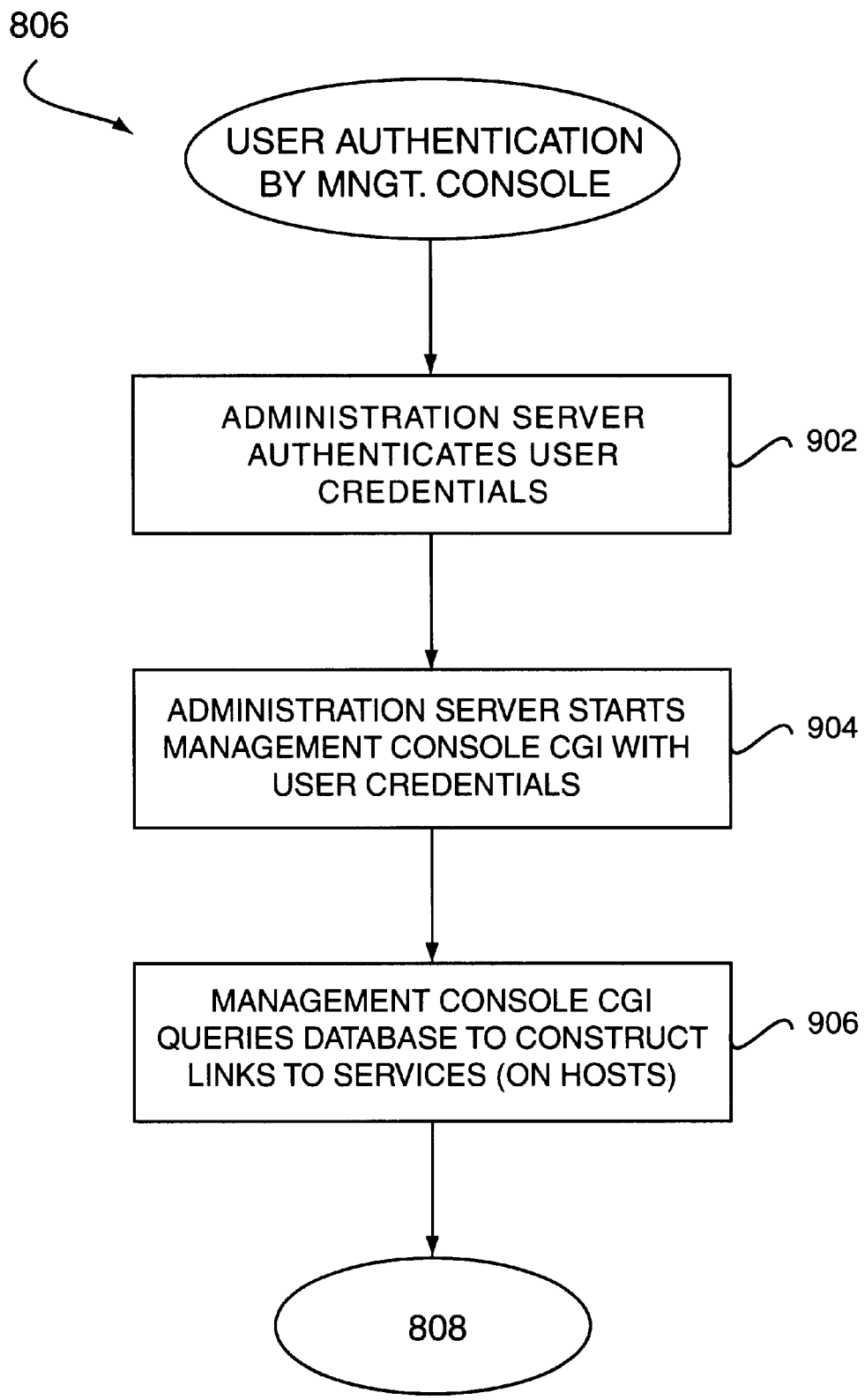

FIG. 9 is a flowchart showing in greater detail step 806 of FIG. 8*a*. In step 806 the user is authenticated and the services that the user is authorized to access are determined and the URLs to each of those services are constructed. At step 902 the management console host authenticates the user by retrieving information relating to the user from the database. This information consists of the user's name and password. Once the user name and password are verified, a list of services that the user is authorized to manage is derived. At step 904 the console host initiates the management console segment 226 of the CGI program with the user credentials which were verified at step 902. As described above, this is the first step in establishing a link with a service host.

The other component of the CGI is the servlet CGI (item 224 of FIG. 2) is used to establish the connection with the service host. At step 906 the management console CGI queries database 212 of FIG. 2 to obtain the list of services the user is authorized to manage. Links to these services are constructed in the form of URLs to all the services on the list. The database contains an entry for each user that contains information including the user's name, password, level (e.g. super system administrator), and a list of services that the user is allowed to manage. A super system administrator can manage all services and define access control parameters for the other users (e.g. junior system administrators). The list of services contains "user friendly" names of the services (also contained in the database) instead of the services URL. Control then returns to step 806 of FIG. 8*a* where the user selects which services he wants to manage from the list of services.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like.. It should remembered, however, that all of these and similar terms are to be associated with the appropriate physical quantities and are merely convenient labels applied to these quantities.

The present invention also relates to a device, system or apparatus, such as browser host 216 and management console host 208 for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 10:
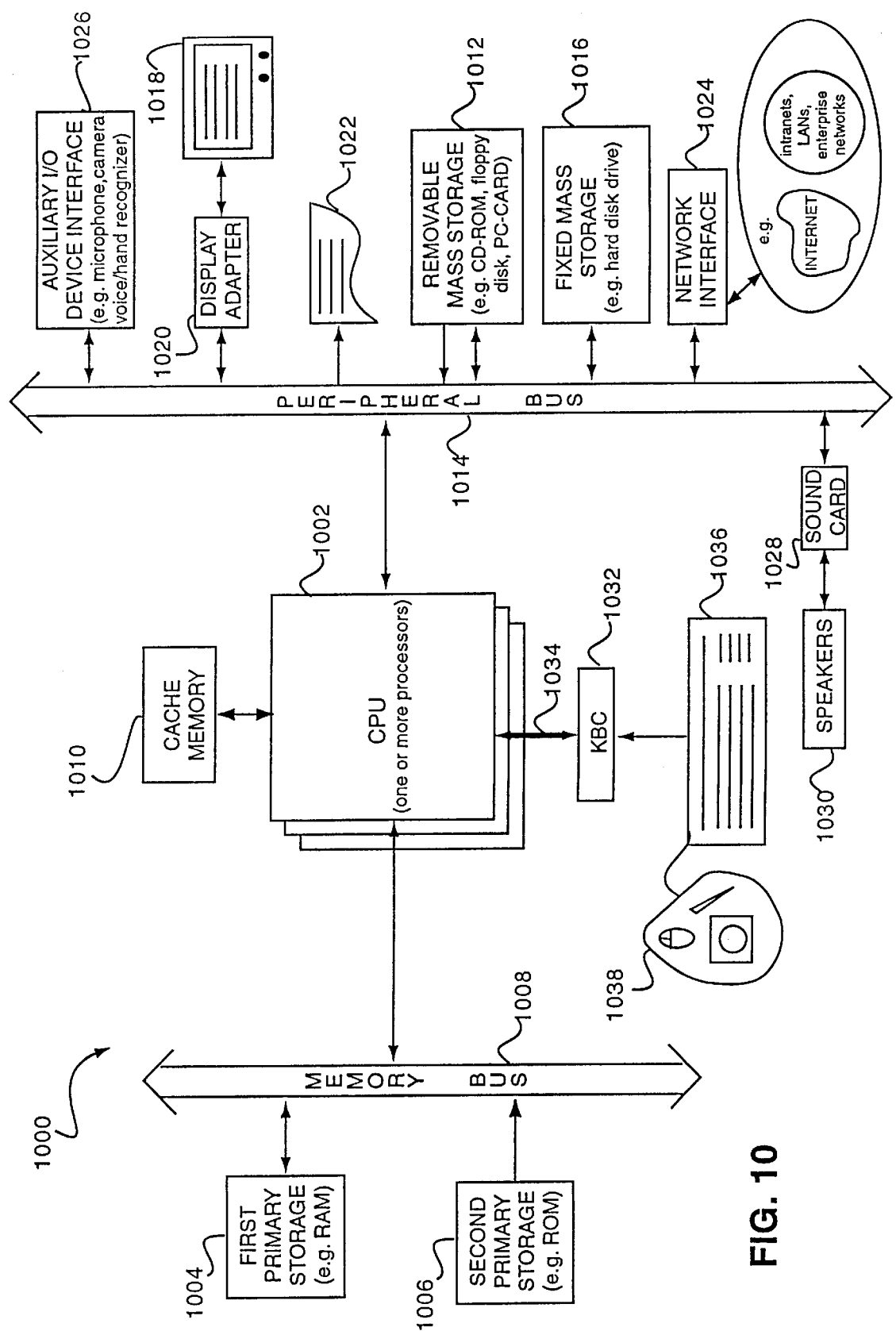
FIG. 10 is a block diagram of a typical computer system suitable for implementing an embodiment of the present invention.

FIG. 10 is a block diagram of a general purpose computer system 1000 suitable for carrying out the processing in accordance with one embodiment of the present invention. The management console program including the authentication and access control layer can resides on such a general purpose computer. In addition, browser host 216 can be such a general purpose computer. FIG. 10 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory, the CPU 1002 controls the reception and manipulation of input data, and the output and display of data on output devices.

CPU 1002 is coupled bi-directionally with a first primary storage 1004, typically a random access memory (RAM), and uni-directionally with a second primary storage area 1006, typically a read-only memory (ROM), via a memory bus 1008. As is well known in the art, primary storage 1004 can be used as a general storage area and as scratch-pad memory, and can also be used to store input data and processed data. It can also store programming instructions and data, for example in the form of a hierarchical database such as database 212 in addition to other data and instructions for processes operating on CPU 1002, and is used typically used for fast transfer of data and instructions in a bi-directional manner over the memory bus 1008. Also as well known in the art, primary storage 1006 typically includes basic operating instructions, program code, data and objects used by the CPU 1002 to perform its functions. Primary storage devices 1004 and 1006 may include any suitable computer-readable storage media, described below, depending on whether, for example, data access needs to be bi-directional or uni-directional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, PC-CARDS, portable mass storage devices, holographic storage devices, and other storage devices. A fixed mass storage 1016 also provides additional data storage capacity and is coupled bi-directionally to CPU 1002 via peripheral bus 1014. The most common example of mass storage 1016 is a hard disk drive. Generally, access to these media is slower than access to primary storage 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, or telecommunications network using a network connection as shown. Through the network interface 1024, it is contemplated that the CPU 1002 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1002 is a keyboard controller 1032 via a local bus 1034 for receiving input from a keyboard 1036 or a pointer device 1038, and sending decoded symbols from the keyboard 1036 or pointer device 1038 to the CPU 1002. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system shown FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the invention has been described using a Web server as the administration server, a non-Web based server can also be used to run the management console program. In another example, database 212 can be a distributed database stored on the console host and various service hosts rather than at a single persistent database. In yet another example, data retrieval protocols other than LDAP can be used to retrieve data from database 212 or from a flat file stored on a persistent storage area. In yet another example, the discover routine can be run "locally" on a service host while the service is being installed instead of at a later time on the console host. Accordingly, the present embodiments are to be considered as illustrative and not restrictive, and the invention is not to be limited to the details given herein, but may be modified within the scope and equivalents of the appended claims.

What is claimed is:

1. A method of managing services in a computer network, the method comprising:

installing a service having a management module on a first server computer;

storing data relating to the management module in a predetermined location associated with the first server computer;

retrieving the data relating to the management module from the predetermined location associated with the first server computer using a management program residing on a second server computer; and storing the data relating to the management module in a storage area accessible by the management program residing on a second server computer thereby enabling modification of the service installed on the first server computer from the second server computer.

2. A method as recited in claim 1 further comprising accessing the management program on the second server through an administration console having a display monitor.

3. A method as recited in claim 2 wherein the administration console contains a Web browser program.

4. A method as recited in claim 2 further comprising utilizing the management program to read data from the storage area and to construct a user interface to be displayed on the display monitor, the user interface used to access the management program.

5. A method as recited in claim 1 wherein storing data relating to the management module in a predetermined location on the first server computer further comprises:

assigning an identifier to the management module;

determining a type associated with the management module;

assigning a descriptive name for the service;

determining a specific location of the management module; and saving the identifier, the type, the specific location, and the descriptive name in a component configuration file in the predetermined location.

6. A method as recited in claim 5 wherein retrieving the data relating to the management module using a management program residing on a second server computer further comprises searching the predetermined location for one or more component configuration files associated with one or more services desired to be registered.

7. A method as recited in claim 1 wherein retrieving the data relating to the management module using a management program residing on a second server computer further comprises:

executing a list command on the first server computer to obtain a list of component configuration files from which one or more component configuration files associated with a service can be chosen for registration.

8. A method as recited in claim 7 wherein retrieving the data from the first server computer using the management program residing on a second server computer further comprises executing a content retrieval command on the first server computer to obtain contents of files where each file is associated with a service.

9. A method as recited in claim 1 wherein the predetermined location is a specified directory residing on the first server computer.

10. A method as recited in claim 1 wherein the second server computer communicates with the first server computer using an Internet Protocol.

11. A method as recited in claim 1 wherein the service includes a service segment and the management module, wherein management information relating to a service resides in the management module.

12. A method as recited in claim 1 wherein the first server computer contains a plurality of services, wherein each service includes a service segment and the management module, the management module having associated management data that is stored in the predetermined location.

13. A method as recited in claim 1 further comprising creating a location identifier for accessing the management console, wherein the location identifier is a Uniform Resource Locator.

14. A method as recited in claim 1 wherein storing data relating to the management module further comprises registering management information by placing the information in a configuration file and storing the configuration file in the predetermined location.

15. A method as recited in claim 1 wherein installing a service having a management module on a first server computer further comprises:

installing service code associated with the service in a service portion on the first server computer and the management module relating to the service in a management portion on the first server computer.

16. A method as recited in claim 1 wherein retrieving the data relating to the management module using a management program residing on a second server computer further comprises:

initiating a program executer connected to the second server computer for executing commands and transferring service-related data between the first server computer and the second server computer.

17. A system for managing services in a computer network, the system comprising:

a host server computer installed with a service having a management module;

a first management data storage mechanism for storing management data relating to the service in a predetermined location associated with the host server computer;

a data retriever that retrieves the management data relating to the service from the predetermined location associated with the host server computer using a central service manager residing on an administration server computer; and a second management data storage mechanism for storing the management data relating to the service in a data repository accessible by the central service manager residing on the administration server computer thereby enabling modification of the service installed on the host server computer from the administration server computer.

18. A system as recited in claim 17 further comprising an administration console having a display monitor for accessing the central service manager on the administration server computer.

19. A system as recited in claim 18 wherein the administration console contains a Web browser program.

20. A system as recited in claim 18 further comprising a user interface constructor utilizing the central service manager for reading data from the data repository to construct a user interface to be displayed on the display monitor, wherein the user interface is used to access the central service manager.

21. A system as recited in claim 17 wherein the first management data storage mechanism further comprises:

an identification assigner for assigning an identifier to the management module;

a type examiner for determining a type associated with the management module;

a management module locator for determining a specific location of the management module; and a saving mechanism for saving the identifier, the type, and the specific location in a component configuration file in the predetermined location.

22. A system as recited in claim 21 wherein the data retriever further comprises a data seeker for searching the predetermined location for one or more component configuration files associated with one or more services desired to be registered.

23. A system as recited in claim 17 wherein the predetermined location is a specified directory residing on the host server computer.

24. A system as recited in claim 17 wherein the administration server computer communicates with the host server computer using an Internet Protocol.

25. A system as recited in claim 17 wherein the service includes a service segment component and the management module, wherein the management data relating to a service resides in the management module.

26. A system as recited in claim 17 wherein the host server computer contains a plurality of services, wherein each service includes a service segment component and the management module, the management module having associated management data stored in the predetermined location.

27. A system as recited in claim 17 wherein the first management data storage mechanism further comprises a registration mechanism for registering management data that places the management data in a configuration file and stores the configuration file in the predetermined location.

28. A system as recited in claim 17 wherein the data retriever further comprises a program executer connected to the administration server computer for executing commands and transferring service-related data between the administration server computer and the host server computer.

29. A method for managing registration of services in a computer network that includes an administration server and at least one service host computer that is separate from the administration server, the method comprising:

receiving a service identifier at the administration server indicative of a service desired to be registered, the service residing on the service host computer;

interrogating the service host computer to determine whether the service has been registered;

copying service management files related to the service to the administration server when it is determined that the service has not been registered;

storing the service management files related to the service in a persistent global database accessible by the administration server and the service host computer; and managing the service by accessing and modifying management data in the service management files through the administration server.

30. A method as recited in claim 29 wherein interrogating the service host computer further comprises scanning a component configuration directory on the service host computer.

31. A method as recited in claim 29 wherein copying service management files further comprises transferring service-related data and commands using a program interface having an administration server component and a host server component.

32. A method as recited in claim 29 further comprising registering services on the plurality of service host computers by entering commands at an administrative console connected to the administration server computer.

33. A system for managing services in a computer network, the system comprising:

an administration server under the control of an administration server program having a management console program and an interface mechanism for communicating data and executing commands remotely;

a plurality of host servers, each host server under the control of a host server program having a management module segment and a specified directory for holding configuration files relating to the management module;

a client having a display monitor connected to the administration server and able to communicate data with the management console program on the administration server; and a memory component capable of storing data associated with the services and accessible by the administration server, the one or more host servers, and the client.

34. A system as recited in claim 33 wherein the interface mechanism further comprises a service management interface component and a host server program interface component.

35. A computer readable medium configured to store computer programming instructions for managing services in a computer network, the computer programming instructions comprising:

installing a service having a management module on a first server computer;

storing data relating to the management module in a predetermined location associated with the first server computer;

retrieving the data relating to the management module from the predetermined location associated with the first server computer using a management program residing on a second server computer; and storing the data relating to the management module in a storage area accessible by the management program residing on a second server computer thereby enabling modification of the service installed on the first server computer from the second server computer.

* * * * *